2,745,850
Patented May 15, 1956

2,745,850

DEBROMINATION OF 16-BROMO-C₂₁-STEROIDS

Martin W. Farrar, Webster Groves, Mo., assignor to Monsanto Chemical Company, St. Louis, Mo., a corporation of Delaware No Drawing. Application November 27, 1953,
Serial No. 394,868

10 Claims. (Cl. 260—397.45)

This invention relates to a new and novel process for debrominating 16-bromo-$C_{21}$-steroids.

In accordance with this invention it has been found that 16-bromo-$C_{21}$-steroids, i. e. saturated and unsaturated pregnanes having a 16-bromo-substituent, are efficiently de-brominated by employment of a low molecular weight carboxylic acid in conjunction with a Raney nickel catalyst that has been modified by treatment with a hydrogen acceptor such as compounds containing carbon-carbon double bonds (e. g. ethylene compounds) and compounds containing carbon-oxygen double bonds (e. g. ketones and aldehydes).

If normally active Raney nickel is employed per se or in conjunction with a low molecular weight carboxylic acid the object of this invention is not accomplished. The Raney nickel catalyst of this invention, however, when employed in conjunction with a low molecular weight carboxylic acid, particularly acetic acid, provides a means whereby the bromine atom of 16-bromo-$C_{21}$-steroidal compound is removed and replaced by a hydrogen atom. The Raney nickel catalyst of this invention is characterized by being modified with a hydrogen acceptor and such modification or treatment may be advantageously carried out by refluxing normally active Raney nickel with a hydrogen acceptor, usually for a period of about one hour. However, such time element will depend upon the catalyst's initial activity, the particular hydrogen acceptor, ratio of catalyst to hydrogen acceptor, etc. The so modified Raney nickel catalyst does not reduce carbonyl groups or ethylenic linkages in the 16-bromo steroidal compounds treated or the debrominated products produced. Acetone has been found especially suitable for modification of the Raney nickel catalyst. However, any other suitable hydrogen acceptor may also be employed.

The debromination is conducted conveniently by mixing together the modified Raney nickel catalyst, a low molecular weight carboxylic acid such as acetic acid, propionic acid, butyric acid, etc., and a selected 16-bromo steroidal compound. The weight ratio of carboxylic acid to the 16-bromo-$C_{21}$-steroid may vary widely, however, weight proportions of 0.1 to 10 of the former to 1 of the latter are preferred. The temperature of the debromination is ordinarily maintained between about 20° C. and 100° C. and preferably from about 25 to about 65° C. Common inert organic solvents such as acetone, alcohol, ether and the like may be employed. Likewise water may be employed or mixtures of water and a water-miscible organic solvent.

The new process of this invention has found particular utility in converting a 16β-bromo-17α-hydroxy-3,20-diketo-pregnene or -pregnadiene directly to the corresponding 17α-hydroxy-3,20-diketo-pregnene or -pregnadiene. As illustrative of such 16β-bromo-17α-hydroxy-3,20-diketo-pregnene or -pregnadiene which may be efficiently converted to the corresponding 17α-hydroxy-3,20-diketo-pregnene or -pregnadiene are:

16β-bromo-17α-hydroxy-progesterone
16β-bromo-17α-hydroxy-11-keto-progesterone
16β-bromo-11β-17α-dihydroxy-progesterone
16β-bromo-11β,17α,21-trihydroxy-progesterone and 21-esters thereof such as the acetate, propionate, butyrate, etc.
16β-bromo-17α,21-dihydroxy-11-keto-progesterone and 21-esters thereof such as the acetate, propionate, butyrate, etc.
16β-bromo-17α-hydroxy-6-dehydroprogesterone
16β-bromo-17α-hydroxy-9(11)-dehydroprogesterone
16β-bromo-17α-hydroxy-11-dehydroprogesterone
16β-bromo-17α,21-dihydroxy-9(11)-dehydroprogesterone and 21-esters thereof such as the acetate, propionate, butyrate, etc., and like compounds.

As illustrative of the process of this invention is the following:

Example I

A suspension of 1.2 parts by weight of Raney nickel in approximately 10 parts by weight of acetone is heated under reflux for one hour and cooled to room temperature. Thereto is added and intimately mixed 0.12 part by weight of 16β-bromo-cortisone acetate, 1.2 parts by weight of water, 10 parts by weight of acetone and 0.25 part by weight of acetic acid. The mix so obtained is then refluxed under a nitrogen atmosphere for 4 hours. The mixture is filtered and the residue washed with hot acetone. The washings and original filtrate are combined and then subjected to vacuum distillation. The residue is taken up with chloroform, washed with aqueous sodium bicarbonate followed by a water wash and dried. Upon subjecting the solution to vacuum distillation 0.109 part by weight of a crude crystalline residue is obtained, which residue upon recrystallization from diethyl ether yielded substantially pure cortisone acetate in a 71% theory yield.

Omitting the inclusion of low molecular weight carboxylic acid in the process of this invention the improved results are not obtained, for example, a suspension of 1 part by weight of Raney nickel in approximately 20 parts by weight of acetone is heated under reflux for one hour and cooled to room temperature. Thereto is added and intimately mixed 0.2 part by weight of 16β-bromo-cortisone acetate, 2.5 parts by weight of water and 16 parts by weight of acetone. The mix so obtained is then refluxed under a nitrogen atmosphere for 4 hours. The mixture is filtered and the residue washed with hot acetone. The washings and original filtrate are combined and then subjected to vacuum distillation. The residue is taken up with chloroform, washed with water and dried. Upon subjecting the solution to vacuum distillation 0.19 part by weight of a crude residue is obtained which residue contains approximately 15–20% cortisone acetate, the remainder consisting chiefly of the 16,17-epoxide of cortisone acetate.

As further illustrative of the novel process of this invention is the following:

Example II

A suspension of 14 parts by weight of Raney nickel in approximately 112 parts by weight of acetone is heated under reflux for one hour and cooled to room temperature. Thereto is added and intimately mixed 1.4 parts by weight of 16β-bromo-17α,21-dihydroxy-9(11)-dehydroprogesterone-21-acetate, 14 parts by weight of water, 2.94 parts by weight of acetic acid and 80 parts by weight of acetone. The mix so obtained is then refluxed under a nitrogen atmosphere for 4 hours. The reaction mix is filtered and the residue is washed with hot acetone. The washings and original filtrate are combined and subjected to vacuum distillation. The residue is taken up with chloroform, washed with aqueous sodium bicarbonate, followed by a water wash and dried.

Upon subjecting the solution to vacuum distillation a crude crystalline residue is obtained, which residue upon recrystallization yielded substantially pure 17α,21-dihydroxy-9(11)-dehydroprogesterone-21-acetate in a 98.5% of theory yield.

Other 16-bromo-C₂₁-steroids which may be debrominated in accordance with the process of this invention are:

16-bromo-pregnane
16-bromo-allopregnane
16-bromo-17-hydroxy-allopregnane
16-bromo-3-keto-pregnane
16-bromo-3,20-diketo-pregnane
16-bromo-pregnenolone
16-bromo-pregnane-3,17-diol
16-bromo-3,17-dihydroxy-20-keto-pregnane
16-bromo-3-hydroxy-20-keto-Δ⁵-pregnene-acetate
16-bromo-3-hydroxy-20-keto-allopregnane, and the like.

While the present invention has been described with respect to certain embodiments it is not so limited and it is to be understood that variations and modifications thereof obvious to those skilled in the art may be made without departing from the spirit or scope of this invention.

What is claimed is:

1. In a process for debrominating 16-bromo-steroids the steps which comprise mixing together in the presence of an inert solvent a 16-bromo-C₂₁-steroid with a low molecular weight carboxylic acid and a Raney nickel catalyst that has been modified by treatment with a hydrogen acceptor and heating said mixture at a temperature in the range of 20° C. to about 100° C.

2. The process of claim 1 wherein the Raney nickel catalyst has been modified by treatment with acetone.

3. The process of claim 1 wherein the Raney nickel catalyst has been modified by treatment with acetone and the reaction is conducted at a temperature in the range of about 25° C. to about 65° C.

4. A process which comprises mixing together in the presence of an inert solvent a member of the group consisting of 16β-bromo-17α-hydroxy-3,20-diketo-pregnenes and 16β-bromo-17α-hydroxy-3,20-diketo-pregnadienes with acetic acid and a Raney nickel catalyst that has been modified by treatment with a hydrogen acceptor of the group consisting of compounds containing carbon-carbon double bonds and compounds containing carbon-oxygen double bonds, heating said mixture at a temperature in the range of 20° C. to about 100° C., and subsequently recovering the debrominated 17α-hydroxy compound.

5. A process for debrominating a 16β-bromo-17α-hydroxy-3,20-diketo-pregnene which comprises mixing together in the presence of an inert solvent a 16β-bromo-17α-hydroxy-3,20-diketo-pregnene, acetic acid and a Raney nickel catalyst that has been modified by treatment with acetone, heating said mixture at a temperature in the range of about 25° C. to about 65° C., and subsequently recovering the debrominated 17α-hydroxy-progesterone compound.

6. The process of claim 5 wherein the 16-bromo-steroidal compound is 16β-bromo-cortisone acetate.

7. The process of claim 5 conducted at the refluxing temperature.

8. The process of claim 5 wherein the inert solvent is acetone.

9. The process of claim 8 conducted at the refluxing temperature.

10. The process of claim 9 wherein the 16-bromo-steroidal compound is 16β-bromo cortisone acetate.

References Cited in the file of this patent

UNITED STATES PATENTS 2,602,804    Kendall  ---------------- July 8, 1952

OTHER REFERENCES

Fieser et al.: Natural Products Related to Phenanthrene, 3rd ed., page 425 (1949).